July 2, 1957 T. E. PENLINGTON ET AL 2,798,173
SUBMERSIBLE ELECTRIC MOTORS
Filed Feb. 9, 1954 4 Sheets-Sheet 1

FIG.I.

Thomas E. Penlington &
Bernard Cooksley
by Kenway, Jenney, Witter & Hildreth
Attys.

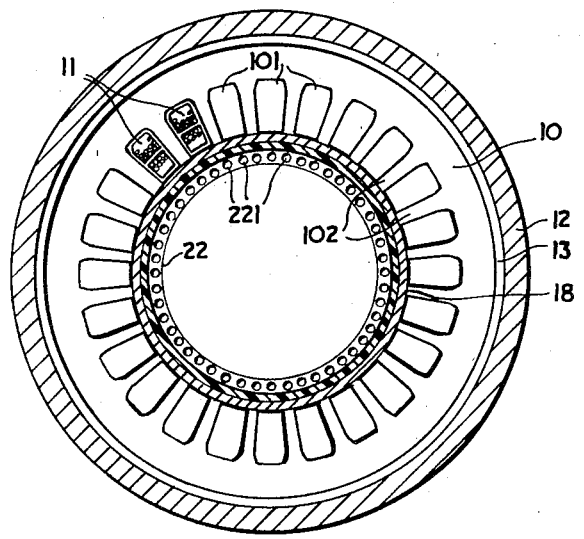
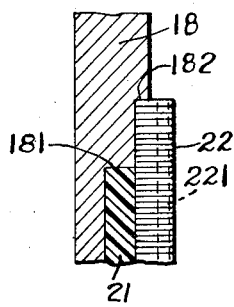
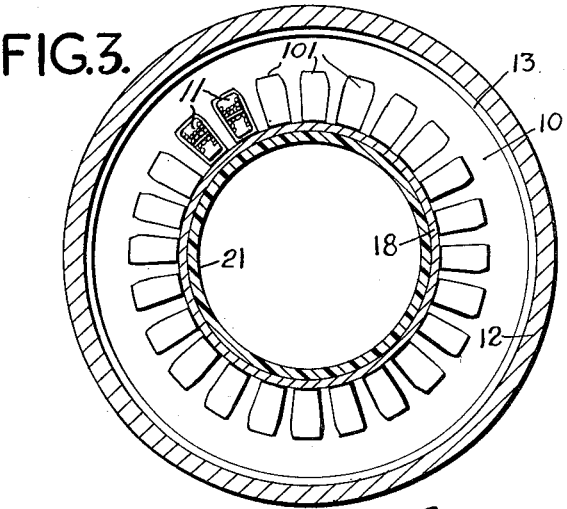

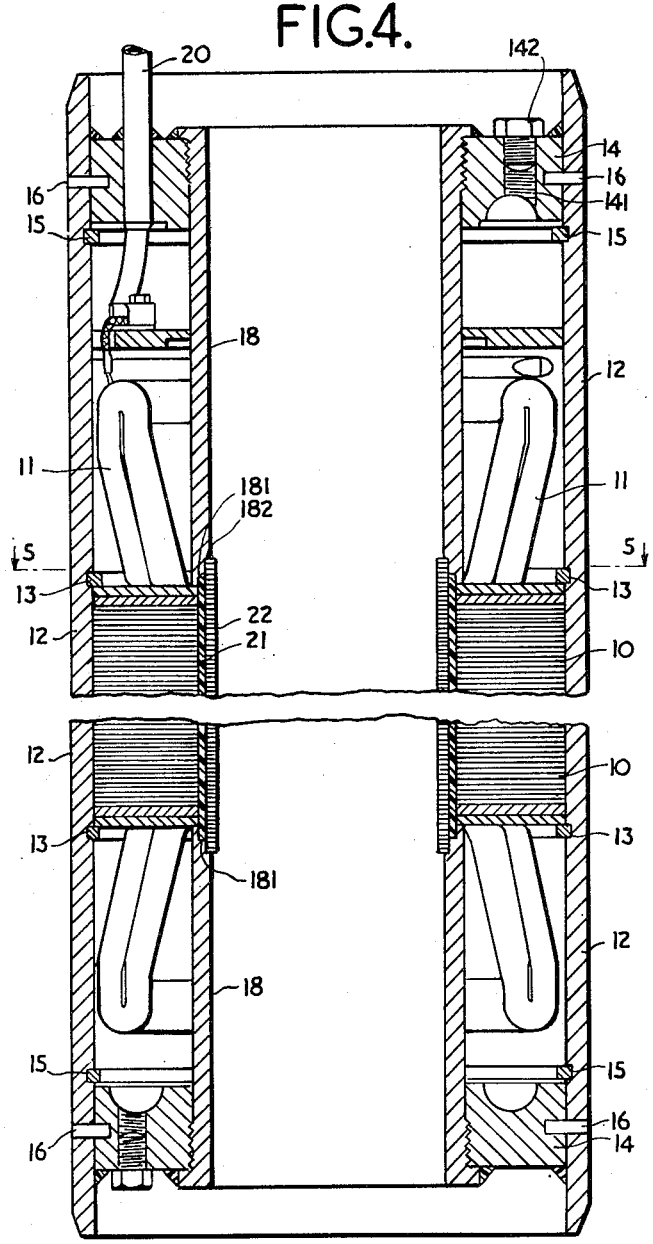

United States Patent Office 2,798,173
Patented July 2, 1957

2,798,173
SUBMERSIBLE ELECTRIC MOTORS

Thomas Edward Penlington, Ward End, Birmingham, and Bernard Cooksley, Quinton, Birmingham, England, assignors to James Beresford & Son Limited, Birmingham, England, a company with limited liability incorporated of Great Britain Application February 9, 1954, Serial No. 409,238

Claims priority, application Great Britain November 23, 1953

3 Claims. (Cl. 310—86)

This invention comprises improvements relating to submersible electric motors and is concerned specifically with submersible electric motors of the kind in which the stator chamber is required to be sealed from the rotor chamber.

The present invention has for its object to provide a submersible electric motor of the kind aforesaid which is simple in construction, efficient in use and capable of being produced at a relatively lower cost than submersible electric motors of the said kind heretofore in use.

According to the invention the improved submersible electric motor incorporates an inner rotor chamber, a surrounding stator chamber, a laminated slotted stator pack located within said chamber, stator windings disposed within the slots in the stator pack, a filling of plastic material which is adapted to fill the space in the stator slots which is not occupied by the windings, and which is bonded to the stator pack and which serves to define the rotor chamber and to seal the stator chamber from the rotor chamber.

The invention still further resides in a submersible electric motor constructed, arranged and adapted for use substantially as will be described hereinafter.

An embodiment of the invention will now be described with particular reference to the accompanying sheets of drawings which illustrate the invention as applied to a submersible electric motor intended primarily for driving a submersible electrically driven pump which as to its general construction follows that adopted in the case of the electric motors used in the submersible electrically driven pumps known in commerce under the registered trademark "Beresford."

In the drawings:

Figure 3 is a cross section of Figure 2 the cross section being taken on the plane indicated by the line 3—3 in Figure 2 looking in the direction of the arrows to the said line.

Figure 4 is a vertical section of an alternative construction of the completed stator of a submersible electric motor in accordance with the invention for incorporation in a submersible electrically driven pump as depicted in Figure 1.

Figure 5 is a cross section of Figure 4 the section being taken on the plane indicated by the line 5—5 in Figure 4 looking in the direction of the arrows to the said line and Figure 6 is a fragmentary view on an enlarged scale illustrative of the construction adopted in the case of the arrangement illustrated in Figures 4 and 5.

In the drawings like numerals of reference indicate similar parts in the several views.

Figure 1:
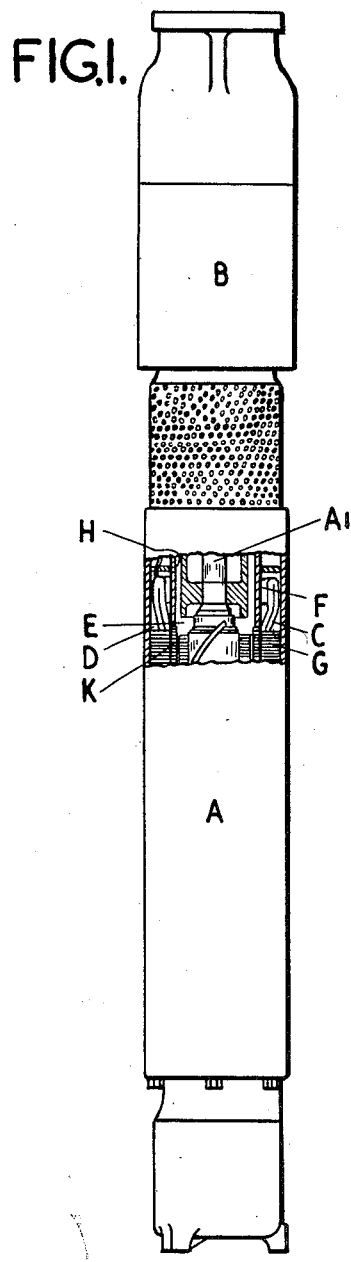
Figure 1 is a view mainly in elevation and partly in section of a Beresford submersible electrically driven pump as at present available in commerce showing sufficient only of the electric motor employed for driving the pump as is necessary to an understanding of the invention.

The Beresford submersible electrically driven pump as at present available and as illustrated in Figure 1 incorporates a submersible electric motor unit which is contained within a housing A and a co-axial superposed multiple unit centrifugal pump which is enclosed within a housing B and which is coupled to the rotor shaft A1 of the electric motor unit, the stator windings C of the electric motor being contained within a chamber D which is sealed from the rotor chamber E by a thin stainless steel tube F with the portions of the tube F which extend on either side of the stator pack G reinforced by metal sleeves H and with the intermediate portion of the tube F reinforced internally by a laminated annular pack K the laminae of which are provided with holes or gaps which are arranged to register with the spaces between the pole pieces of the stator pack so as to provide a magnetic reluctance in the laminae of the said pack which is high in the circumferential direction in comparison with the magnetic reluctance in the transverse direction, said reinforcing pack K serving inter alia to force any buckles which may appear in the tube F outwards into the slots in the stator pack G which are provided for the accommodation of the stator windings C and to present a smooth concentric surface to the rotor.

Figure 2:
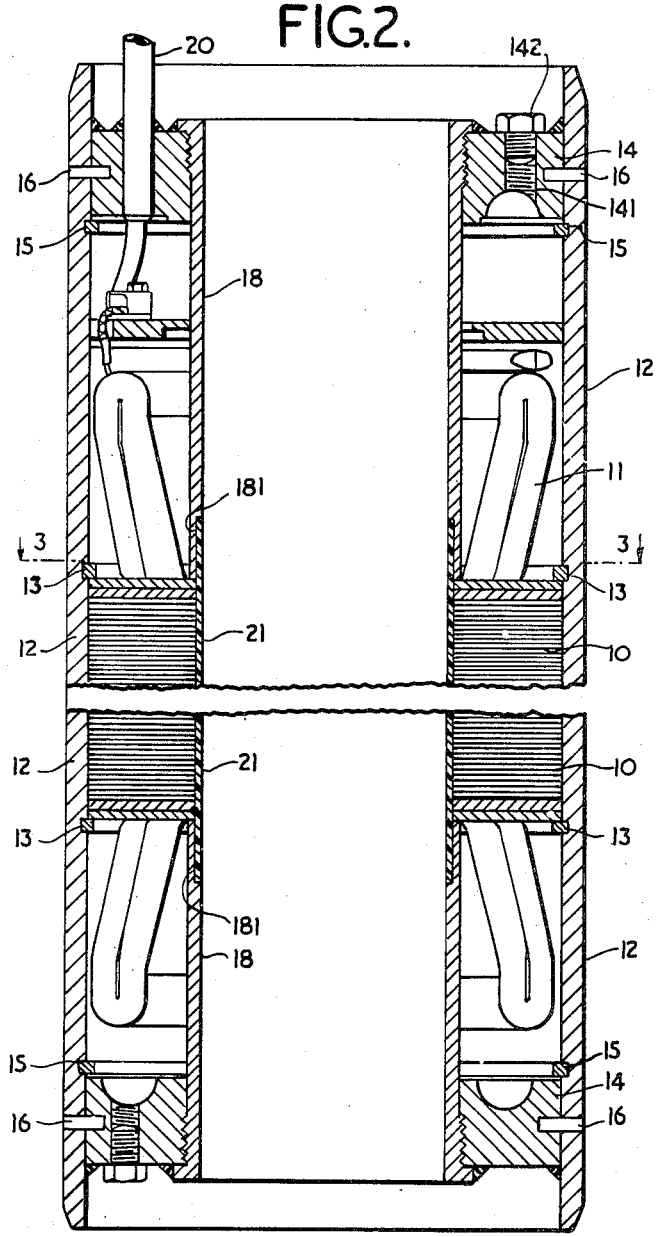
Figure 2 is a vertical section of the completed stator of a submersible electric motor in accordance with the invention for incorporation in an electrically driven submersible pump as depicted in Figure 1.

According to the embodiment of the invention as illustrated in Figures 2 and 3 the laminae of the laminated stator pack 10 are gapped or recessed so that when assembled to form the stator pack the said gaps constitute slots 101 for the reception of the stator windings 11 with the open ends of the said slots 101 presented inwardly.

The stator pack 10 is inserted in the outer casing 12 and positioned therein by locating rings 13.

After insertion of the stator pack 10 in the outer casing 12 as aforesaid there are secured within each end of the casing rings 14 which are located by means of insets 15 and fixed to the outer casing 12 by means of pegs 16.

The rings 14 hereinafter termed the end closure rings 14 are tapped internally for engagement by the correspondingly screw threaded portions of flanged sleeves 18 the diameter of the bores whereof is substantially the same as the minimum internal diameter of the stator pack 10 except that the internal walls of the inner portions of the sleeves 18 are provided with shallow annular recesses 181.

The sleeves 18 are screwed into their respective end closure rings until the inner ends of the said sleeves bear on the presented ends of the stator pack 10.

The stator coils 11 are inserted in the slots 101 prior to the insertion of the sleeves 18.

The end closure rings 14 are provided with tapped holes 141 adapted to be closed by screw plugs 142, said holes 141 after the removal of the screw plugs 142 serving for the filling of the stator chamber with transformer oil in accordance with existing standard Beresford practice.

The conductor cable 20 is passed through a hole in the uppermost end closure ring 14.

After assembly the space in the slots 101 which is not occupied by the stator windings 11 is filled with a synthetic plastic material of a kind known in commerce which is inert to the action of water or oil and which is capable of being bonded to a metal surface by known bonding processes and likewise also the recesses 181 in the sleeves 18 and the intermediate space bounded by the ends of the recesses 181 are also filled with the plastic. There is then inserted into the bores of the sleeves 18 a mandrel (not shown) which smooths the bores and gives the bores the desired internal diameter whereupon the plastic is cured according to known methods depending upon whether the plastic is one which is cold setting or hot setting.

If the hot setting type of plastic is used the plastic chosen must be such that the heat required for curing will not be such as to injure the insulation of the stator windings.

The joints between the end closure rings 14 and the outer casing 12 and between the said end closure rings 14 and the covering of the conductor cable 20 and between the end closure rings 14 and the flanged outer ends of the sleeves 18 are coated with plastic similar to that hereinbefore mentioned.

After "curing" of the plastic it will be appreciated that the end closure rings 14 are bonded to the outer casing 12 and to the outer covering of the conductor cable 20 and to the sleeves 18 whilst at the same time there is provided a plastic lining 21 which is bonded to the laminae of the stator pack 10 and to the sleeves 18.

Thus the stator is contained within a chamber which is sealed from the rotor chamber in a fluid tight manner.

It will be appreciated that the thickness of the plastic lining 21 can be made very small since internal pressure on the part of the lining in contact with the stator pack 10 is resisted by the mass of the stator pack 10 and the filling of the slots 101 whilst the portion of the lining 21 which projects beyond each end of the stator pack 10 and which is contained within the recessed portion of the sleeves 18 is reinforced by the sleeves 18 aforesaid.

In the embodiment of the invention as illustrated in Figures 4 to 6 there is inserted in the interior of the stator assembly prior to curing a laminated reinforcing pack 22 the lamina thereof provided therein with holes 221 which are arranged to register with the spaces between the pole pieces 102 of the stator pack 10 so as to provide a magnetic reluctance in the laminae of the said reinforcing pack 22 which is high in the circumferential direction in comparison with the magnetic reluctance in the transverse direction.

This reinforcing pack 22 corresponds to the reinforcing pack K employed according to existing Beresford practice and which has been referred to hereinbefore.

As indicated in Figures 4 to 6 the reinforcing pack 22 is inserted prior to the curing and is held in position by forming the internal wall of the lower portion of the reinforcing sleeves 18 with a double stepped portion, the innermost stepped portion 182 of which serves to locate the reinforcing pack 22 whilst the innermost stepped portion 181 defines the space to be filled with the plastic which is to form the lining 21 and which is to be bonded to the reinforcing sleeves 18 and to the stator pack 10 to ensure the sealing of the stator chamber from the rotor chamber as in the embodiment first described.

The reinforcing pack 22 is provided with a means (not shown) for ensuring the correct location of the holes 221 in the constituent lamina thereof relative to the spaces between the pole pieces of the stator pack.

If desired the slots 101 in the stator pack 10 may be skewed in order to dispense with the more usual skewing of the conductor bars of the rotor which is commonly adopted in the case of squirrel cage electric motors.

Further if desired instead of filling the spaces in the stator chamber which are not occupied by the stator pack and the stator windings, with transformer oil the said spaces may be filled with synthetic plastic material similar to that employed for the binding and sealing since such material is not only a relatively good conductor of heat and a good electrical insulator but if used as a filling as aforesaid would also prevent water or other liquid in which the motor may be immersed percolating to the windings in the event of leakage of such liquid into the stator chamber.

The submersible electric motor in accordance with the invention has a high efficiency and admits of part of the assembly being performed by relatively unskilled labour thus reducing the cost of production.

We claim:

1. A submersible electric motor incorporating an inner rotor chamber, a surrounding stator chamber, a laminated stator pack having slots therein, the open ends of which are directed inwardly, stator windings located within said slots, annular reinforcing means extending beyond the ends of the stator pack, a recessed portion in the inner periphery of each of said reinforcing means, a filling of plastic material which is adapted to fill the recessed portions of the reinforcing means as well as the spaces in the slots which are not occupied by the windings and an annular space which is bounded by a cylindrical surface of the same radius as the bore of the reinforcing means, and the inner periphery of the stator pack, said plastic material being bonded to the inner periphery of the recessed portion of the reinforcing means and to the inner periphery of the stator pack to constitute a fluid tight filling which serves to define the rotor chamber and to seal the stator chamber from the rotor chamber.

2. A submersible electric motor incorporating an inner rotor chamber, a surrounding stator chamber, a laminated stator pack located within said stator chamber having therein radially arranged slots the open ends of which are directed inwardly, stator windings located within the slots in the stator pack, annular reinforcing means extending beyond the ends of the stator pack, a recessed portion in the inner periphery of each of said reinforcing means, a filling of plastic material adapted to fill the recessed portions of the reinforcing means as well as the spaces in the slots not occupied by the windings, and an annular space which is bounded by a cylindrical surface of the same radius as the bore of the reinforcing means and the inner periphery of the stator pack, said plastic material being bonded to the inner peripheries of the recessed portions of the reinforcing means and to the inner periphery of the stator pack so as to constitute a fluid tight filling which serves to define the rotor chamber and to seal the stator chamber from the rotor chamber, annular end closure means for the stator chamber and a plastic material for bonding the end closure means to the bounding surfaces so as to provide for a fluid tight sealing of the ends of the stator chamber.

3. A submersible electric motor incorporating an inner rotor chamber, a surrounding stator chamber, a laminated stator pack located within said stator chamber having therein radially arranged slots the open ends of which are directed inwardly, stator windings located within the slots in the stator pack, annular reinforcing means extending beyond the ends of the stator pack, a recessed portion in the inner periphery of each of said reinforcing means, a filling of plastic material adapted to fill the recessed portions of the reinforcing means as well as the spaces in the slots not occupied by the windings, and an annular space which is bounded by a cylindrical surface of the same radius as the bore of the reinforcing means and the inner periphery of the stator pack, said plastic material being bonded to the inner peripheries of the recessed portions of the reinforcing means to the inner periphery of the stator pack so as to define the rotor chamber and constitute a lining which serves to seal the stator chamber from the rotor chamber, annular end closure means for the stator chamber, a plastic material for bonding the end closure means to the bounding surfaces so as to provide for a fluid tight sealing of the ends of the stator chamber, means for conducting electric current to the stator windings which passes through an end closure means and a plastic material for bonding the said conducting means to the said end closure means to provide a fluid tight seal between the conducting means and the end closure means.

(References on following page)

References Cited in the file of this patent

UNITED STATES PATENTS

| | | |
|---|---|---|
| 1,396,521 | Myers | Nov. 8, 1921 |
| 1,543,502 | Hobart | June 23, 1925 |
| 1,678,380 | Cooper | July 24, 1928 |
| 2,310,422 | Gold | Feb. 9, 1943 |
| 2,385,385 | Sigmund | Sept. 25, 1945 |
| 2,401,386 | Smellie | June 4, 1946 |
| 2,428,816 | Sigmund | Oct. 14, 1947 |

FOREIGN PATENTS

| | | |
|---|---|---|
| 461,342 | Germany | June 21, 1928 |
| 838,921 | Germany | May 15, 1952 |